(12) United States Patent
Tanaka et al.

(10) Patent No.: US 8,345,313 B2
(45) Date of Patent: Jan. 1, 2013

(54) IMAGE FORMING APPARATUS, METHOD AND CONTROL PROGRAM, FOR ENABLING IMAGE FORMATION OF A VALID PRINT OBJECT WHILE DISABLING IMAGE FORMATION OF AN INVALID PRINT OBJECT ON A PAGE INCLUDING A PLURALITY OF PRINT OBJECTS

(75) Inventors: Yoshinori Tanaka, Shibuya-ku (JP);
Yoko Fujiwara, Kawasaki (JP);
Masahiro Ozawa, Hino (JP); Jun Kuroki, Sagamihara (JP); Hiroshi Nogawa, Hachioji (JP); Fumihito Akiyama, Yokohama (JP); Yasufumi Aoyama, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1456 days.

(21) Appl. No.: 11/872,058

(22) Filed: Oct. 15, 2007

(65) Prior Publication Data

US 2008/0174811 A1 Jul. 24, 2008

(30) Foreign Application Priority Data

Nov. 16, 2006 (JP) ................................. 2006-310566

(51) Int. Cl.
*H04N 1/40* (2006.01)
*G06K 9/00* (2006.01)
*H04L 9/32* (2006.01)

(52) U.S. Cl. ...... 358/3.28; 358/1.9; 358/1.14; 358/1.15; 358/1.16; 358/1.17; 358/1.18; 358/473; 358/488; 358/498; 382/100; 382/123; 382/128; 382/137; 382/162; 382/218; 235/51; 235/375; 235/379; 235/382; 705/76; 705/408; 713/155; 713/170; 713/176; 713/179

(58) Field of Classification Search ........................ None
See application file for complete search history.

(56) References Cited

U.S. PATENT DOCUMENTS 6,052,479 A 4/2000 Hiraishi et al.
(Continued)

FOREIGN PATENT DOCUMENTS

JP 09-018708 1/1997
(Continued)

OTHER PUBLICATIONS

Office Action in JP 2006-310566 dated Oct. 29, 2008, and a English Translation thereof.

(Continued)

*Primary Examiner* — Steven Kau
(74) *Attorney, Agent, or Firm* — Buchanan Ingersoll & Rooney PC

(57) ABSTRACT

There is described an image forming apparatus, which make it possible to appropriately print each of a valid print object and an invalid print object. The apparatus includes: a printing section to conduct a printing operation based on the print data, so as to create the print product; and a control section to determine whether the digital signature is valid or invalid so as to control the printing operation, based on the determined result. When the plurality of print objects includes both a valid print object for which the digital signature is determined as valid and an invalid print object for which the digital signature is determined as invalid, the control section controls the printing operation, so as to enable the valid print object to be printed, based on the print data, while disable the invalid print object to be printed, based on the print data.

15 Claims, 12 Drawing Sheets

U.S. PATENT DOCUMENTS

| | | | |
|---|---|---|---|
| 6,711,677 B1 * | 3/2004 | Wiegley | 713/151 |
| 6,843,418 B2 * | 1/2005 | Jones et al. | 235/462.01 |
| 7,735,144 B2 * | 6/2010 | Pravetz et al. | 726/30 |
| 2001/0047481 A1 * | 11/2001 | Inoha et al. | 713/193 |
| 2005/0111023 A1 * | 5/2005 | Simpson et al. | 358/1.13 |
| 2005/0144469 A1 | 6/2005 | Saitoh | |
| 2005/0165747 A1 * | 7/2005 | Bargeron et al. | 707/3 |
| 2006/0028693 A1 | 2/2006 | Kagawa | |
| 2006/0059271 A1 | 3/2006 | Kato | |
| 2006/0077419 A1 | 4/2006 | Sugiura et al. | |
| 2007/0061579 A1 * | 3/2007 | De Mello et al. | 713/176 |
| 2007/0061583 A1 * | 3/2007 | Kanatsu et al. | 713/176 |

FOREIGN PATENT DOCUMENTS

| | | |
|---|---|---|
| JP | 11-065932 | 3/1999 |
| JP | 11-088323 | 3/1999 |
| JP | 2000-263890 | 9/2000 |
| JP | 2003-084962 | 3/2003 |
| JP | 2003-230019 | 8/2003 |
| JP | 2005-166023 | 6/2005 |
| JP | 2005-216240 | 8/2005 |
| JP | 2005-267022 A | 9/2005 |
| JP | 2006-050161 | 2/2006 |
| JP | 2006-072964 | 3/2006 |
| JP | 2006-121655 | 5/2006 |
| JP | 2006-235930 * | 7/2006 |
| JP | 2006-217489 | 8/2006 |
| JP | 2006-235930 | 9/2006 |
| JP | 2006-295665 | 10/2006 |
| JP | 2008-118423 | 5/2008 |

OTHER PUBLICATIONS

Office Action in JP 2006-310566 dated Apr. 14, 2009, and an English Translation thereof.

Yagi et al., "Nikkei Personal Computer Magazine "Technology of Supporting Vista" No. 513" Published by Nikkei BP Co., Sep. 11, 2006, pp. 56-71, with Partial English Translation.

* cited by examiner

10: PRINTING SYSTEM
20: COMPUTER TERMINAL DEVICE
30: IMAGE FORMING APPARATUS (DIGITAL COMPOUND APPARATUS)
30: IMAGE FORMING APPARATUS (PRINTER)

20: COMPUTER TERMINAL DEVICE
21: CONTROL SECTION

FIG. 3

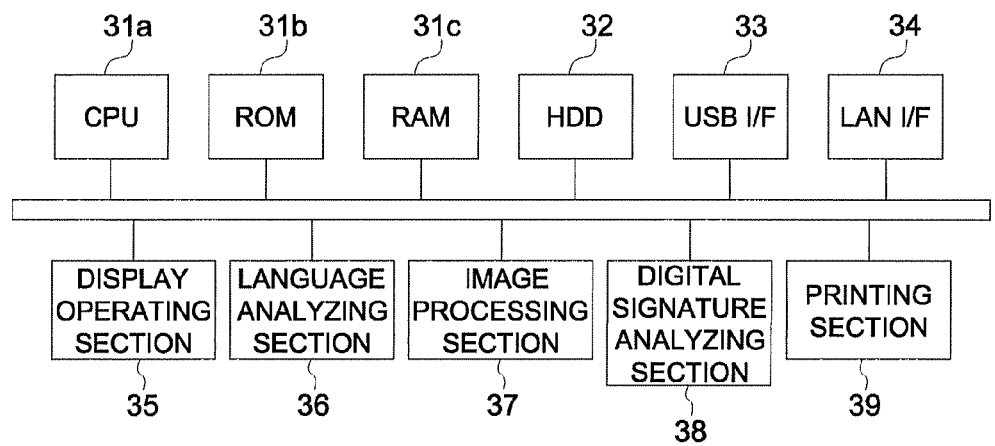

30: IMAGE FORMING APPARATUS

FIG. 4

10.2.1.5 Printing Signed Documents

When printing signed documents, the Print Ticket setting Job Digital Signature Processing SHOULD be used to control the digital signature processing behavior [S10.12]. Producers MAY include the Job Digital Signature Processing setting in the job-level Print Ticket within the XPS Document content [O10.11]. Consumers SHOULD process this Print Ticket setting, if present [S10.12]. For more information, see the Print Schema specification.

Table 10–1. Job Digital Signature Processing Print Ticket settings

| NAME | Description |
| --- | --- |
| Print Invalid Signatures | Print the job regardless of the validity of the digital signatures. Digital signatures can be ignored. |
| Print Invalid Signatures With Error Report | Print the job regardless of the validity of the digital signatures. In the event an invalid signature is encountered, an error page should print at the end of the job. Digital signatures cannot be ignored. |
| Print Only Valid Signatures | Print the job only if all digital signatures are valid. Digital signatures cannot be ignored. |

FIG. 17

40: ERROR REPORT

ERROR REPORT
---

LIST OF FALSIFIED PLACES
    Image 1
    Font
    Fixed Page 2

IMAGE FORMING APPARATUS, METHOD AND CONTROL PROGRAM, FOR ENABLING IMAGE FORMATION OF A VALID PRINT OBJECT WHILE DISABLING IMAGE FORMATION OF AN INVALID PRINT OBJECT ON A PAGE INCLUDING A PLURALITY OF PRINT OBJECTS

This application is based on Japanese Patent Application No. 2006-310566 filed on Nov. 16, 2006 with Japan Patent Office, the entire content of which is hereby incorporated by reference.

BACKGROUND OF THE INVENTION

The present invention relates to an image forming apparatus, a printing method and a control program, and specifically relates to an image forming apparatus, a printing method and a control program, each of which prints a document created on the basis of the XML Paper Specification (hereinafter, also referred to as the XPS).

In recent years, there have been increasingly proliferated in the market various kinds of copiers or multi-functional apparatuses, each provided with a combination of plural functions, such as a copy function, a facsimile function, a printer function, a scanner function, etc., (hereinafter, referred to as an image forming apparatus as a general term for each of them). When the image forming apparatus is employed as the network printer to implement the printing operation, at first, the concerned document is created by using the application program installed in advance in the computer terminal device coupled to the network, and then, the created document is converted to the print data in the format of the Page Description Language (hereinafter, also referred to as the PDL, for simplicity), so as to be transmitted to the image forming apparatus concerned. Receiving the print data from the computer terminal device, the image forming apparatus parses the print data to create intermediate data, and then, further converts the intermediate data to bitmap data, so as to output an image based on the bitmap data onto a paper medium.

On that occasion, since there is a fear that the print data to be transmitted through the network might be possibly falsified during the transmitting operation of the print data, the method for judging the validity of the print data by employing a digital signature has been usually employed. For instance, Japanese Non-Examined Patent Publication Tokkai 2005-267022 sets forth a method in which: the digital signature and the electronic certificate attached to the document data concerned are used to decrypt the digital signature by employing the public key included in the electronic certificate to acquire hash values; the hash values inherent to the document data are compared with the hash values acquired; the document data is determined to not to be falsified if the hash values inherent to the document data coincide with those acquired; document data including hidden character information is created to output to the printer concerned; and thus the printer prints an image represented by the document data including the hidden character information.

Accordingly, by employing the digital signature mentioned in the above, it is possible to judge presence or absence of a manipulation of the print data. Further, when the manipulation of the print data is detected, the conventional image forming apparatus has implemented the printing operation in any one of three modes including a first mode in which all of the documents are printed irrespective of the validity of the digital signature, a second mode in which all of the documents are printed in addition to a page indicating the fact that the documents are falsified (Error Report) and a third mode in which all of the documents are not printed.

Therefore, when the print product based on the print data is constituted by plural printing objects (namely, pages or parts) and a specific page or part is falsified, the falsified specific page or part is also printed and included in the final print product, since the printing operation is implemented in either the first mode or the second mode mentioned in the above. Accordingly, there has been a problem that the user would erroneously recognize and handle the falsified specific page or part as a correct page or part. Further, when the abovementioned third mode is employed, there has arisen another problem that a certain processing that employs the documents concerned would piled up, since the correct pages or parts are also not printed.

SUMMARY OF THE INVENTION

To overcome the abovementioned drawbacks in conventional image forming apparatus, it is one of objects of the present invention to provide an image forming apparatus, a printing method and a control program, which make it possible to appropriately print each of a valid print object and an invalid print object, so as to improve the user's convenience.

Accordingly, at least one of the objects of the present invention can be attained by the image forming apparatuses described as follows.

(1) According to an image forming apparatus reflecting an aspect of the present invention, 1. An image forming apparatus that produces a print product based on print data including a plurality of print objects, comprising: a printing section to conduct a printing operation; and a control section to control the printing section based on the print data, wherein, in a case where (A) a plurality of digital signatures are respectively attached to the plurality of print objects and (B) the print data includes both of a valid print object for which the digital signature is valid and an invalid print object for which the digital signature is invalid, the control section enables for the valid print object an image formation based on the print data while disables for the invalid print object an image formation based on the print data.

(2) According to another aspect of the present invention, in the image forming apparatus recited in item 1, in the case where the conditions (A) and (B) are satisfied, the control section selectively controls the printing section in either of at least three printing modes, including: a first printing mode in which the control section enables both the valid print objects and the invalid print objects to be printed based on the print data; a second printing mode in which the control section disables both the valid print objects and the invalid print objects to be printed based on the print data; and a third printing mode in which the control section enables the valid print object to be printed based on the print data, while disables the invalid print object to be printed based on the print data.

(3) According to another aspect of the present invention, in the image forming apparatus recited in item 1 or 2, when the invalid print object is a specific page or a specific part included in the specific page, an Error Report, which includes a character string indicating that the specific page is invalid, is printed on the specific page, instead of invalid contents of the specific page or the specific part.

(4) According to still another aspect of the present invention, in the image forming apparatus recited in item 1 or 2, when the invalid print object is a specific part, a character string, indicating that the specific part is invalid, is printed on an area on which invalid contents of the specific part is to be printed.
}

(5) According to yet another aspect of the present invention, in the image forming apparatus recited in item 1 or 2, the print data is created, based on an XPS.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 3 shows a block diagram indicating a configuration of an image forming apparatus embodied in the present invention;

FIG. 4 shows an extracted part of whole specification of the XPS;

FIG. 17 shows an exemplified configuration of an Error Report to be employed in an image forming apparatus embodied in the present invention;

DETAILED DESCRIPTION OF THE PREFERRED EMBODIMENT

Figure 1:
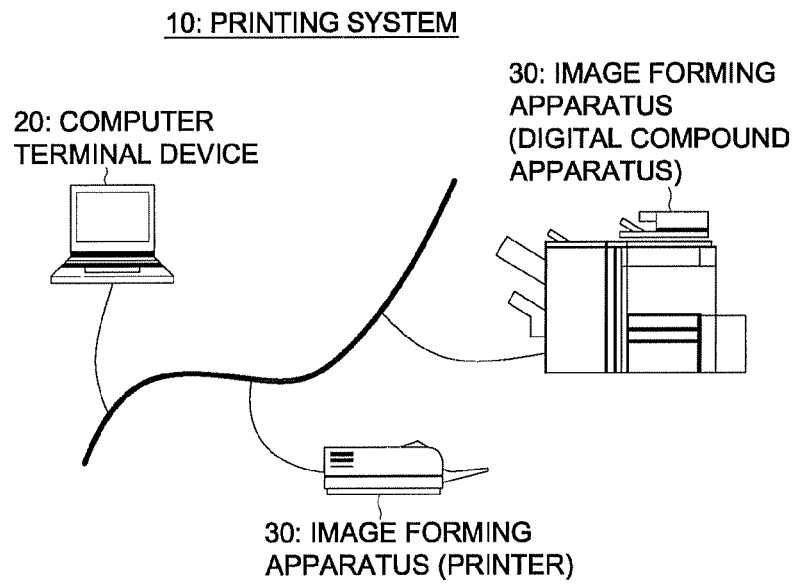
FIG. 1 shows a schematic diagram of a configuration of a printing system embodied in the present invention as the first embodiment.

The well-known as an application program for creating a document is such the application program that is operated on the basis of a standard called the XPS for describing the document in the form of the XML (Extensible Markup Language). It is possible to display the document created on the basis of the XPS by employing the Internet Explorer®. Further, according to features of the XPS, it is possible not only to store the font data, but also to implement the printing operation while displaying the document on the screen. Accordingly, it has been desired to make the image forming apparatus capable of printing the document created on the basis of the XPS.

However, when printing the document created on the basis of the XPS, as indicated in the specification shown in FIG. 4, since the printing operation is implemented in any one of three modes, including a first mode in which the printing operation is implemented irrespective of valid or invalid of the digital signature, a second mode in which the printing operation is implemented irrespective of valid or invalid of the digital signature and an Error Report is printed at a final stage of a job concerned and a third mode in which the printing operation is implemented when all of the digital signatures are valid, there has been a problem that, when the digital signature is determined as invalid, first of all, the user obtains falsified document, secondary, the user would erroneously recognize the falsified document as a correct document and, tertiary, a correct page or a correct part included in the falsified page (hereinafter, referred to as a print object as the general term of them) cannot be printed.

To overcome the abovementioned drawback in the conventional image forming apparatus, when the document created on the basis of the XPS includes both a print object for which the digital signature is valid and another print object for which the digital signature is invalid, the present invention makes it possible to print the print object for which the digital signature is valid, based on the print data, while not to print the other print object for which the digital signature is invalid, based on the print data, but to print the information indicating that the digital signature of the other print object is invalid, instead of determining whether all of the documents (or all of the documents and the Error Report) should be printed or all of the documents should not be printed.

Concretely speaking, by adding a parameter to the XPS prescribed keyword (namely, Job Digital Signature Processing keyword), a keyword designating a mode in which only an Error Report is printed when the digital signature is invalid, another keyword designating another mode in which only a page for which the digital signature is valid is printed while an Error Report is printed with respect to another page for which the digital signature is invalid, and still another keyword designating still another mode in which only a print object for which the digital signature is valid is printed while an Error Report is printed with respect to another print object for which the digital signature is invalid, are added to the XPS prescribed keyword.

According to the above, it becomes possible to securely provide a page or a part for which the digital signature is valid to the user without showing another page or anther part for which the digital signature is invalid. Further, by embedding information indicating invalid into the page or the part for which the digital signature is invalid, it becomes possible for the user to determine which page or which part is falsified, resulting in an improvement of the user's convenience.

Embodiment

Figure 2:
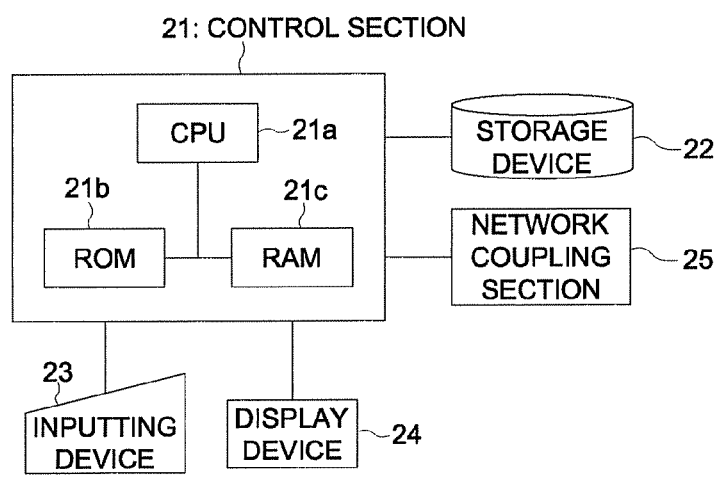
FIG. 2 shows a block diagram indicating a configuration of a computer terminal device embodied in the present invention.
Figure 5:
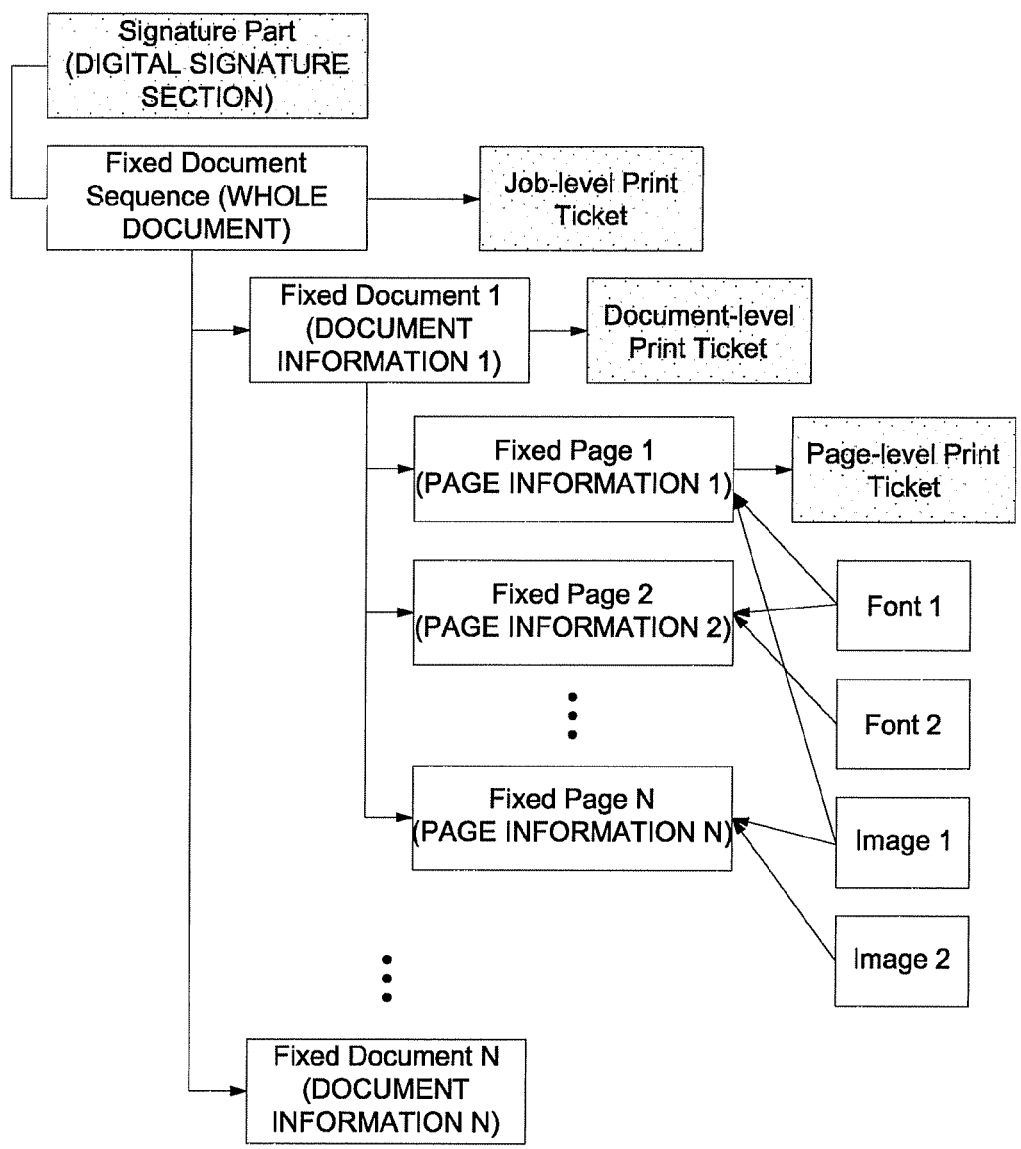
FIG. 5 shows a structure of the XPS data.
Figures 6, 7:
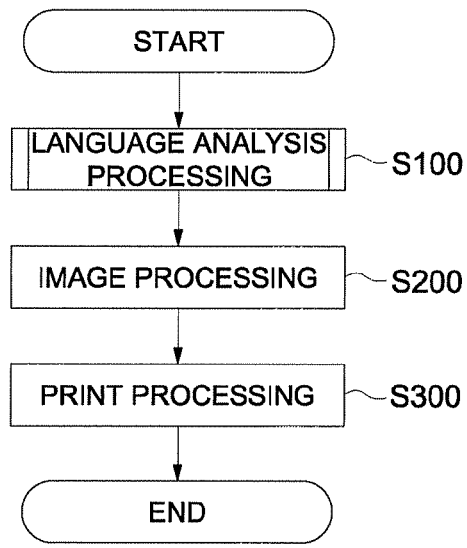
FIG. 6 shows an exemplified configuration of a print setting screen to be displayed on an operating display section of a computer terminal device embodied in the present invention.
FIG. 7 shows a flowchart of printing procedures to be employed in a printing system embodied in the present invention.
Figure 18:
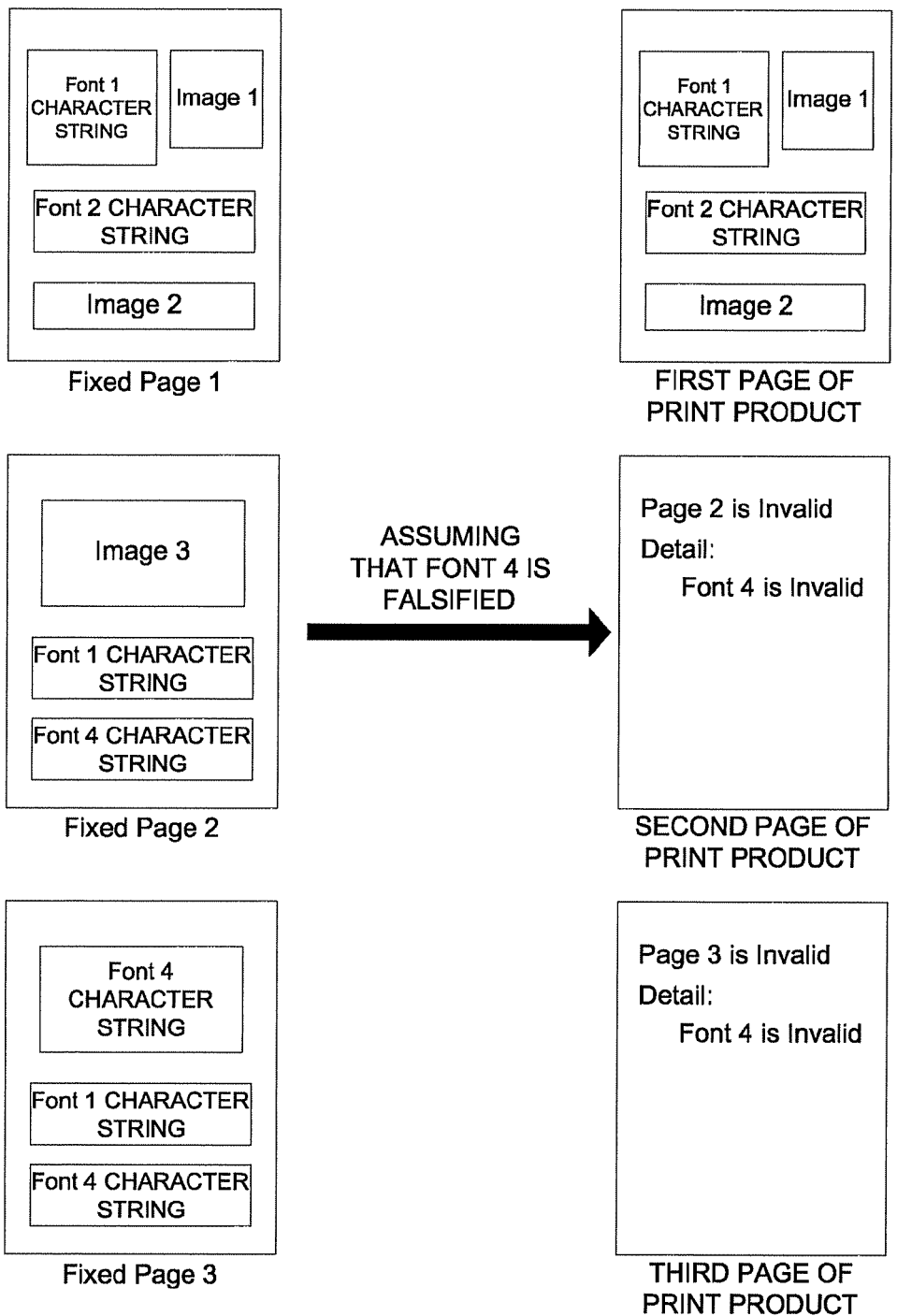
FIG. 18 shows examples of documents printed in a Print Only Valid Page mode to be employed in an image forming apparatus embodied in the present invention.
Figure 19:
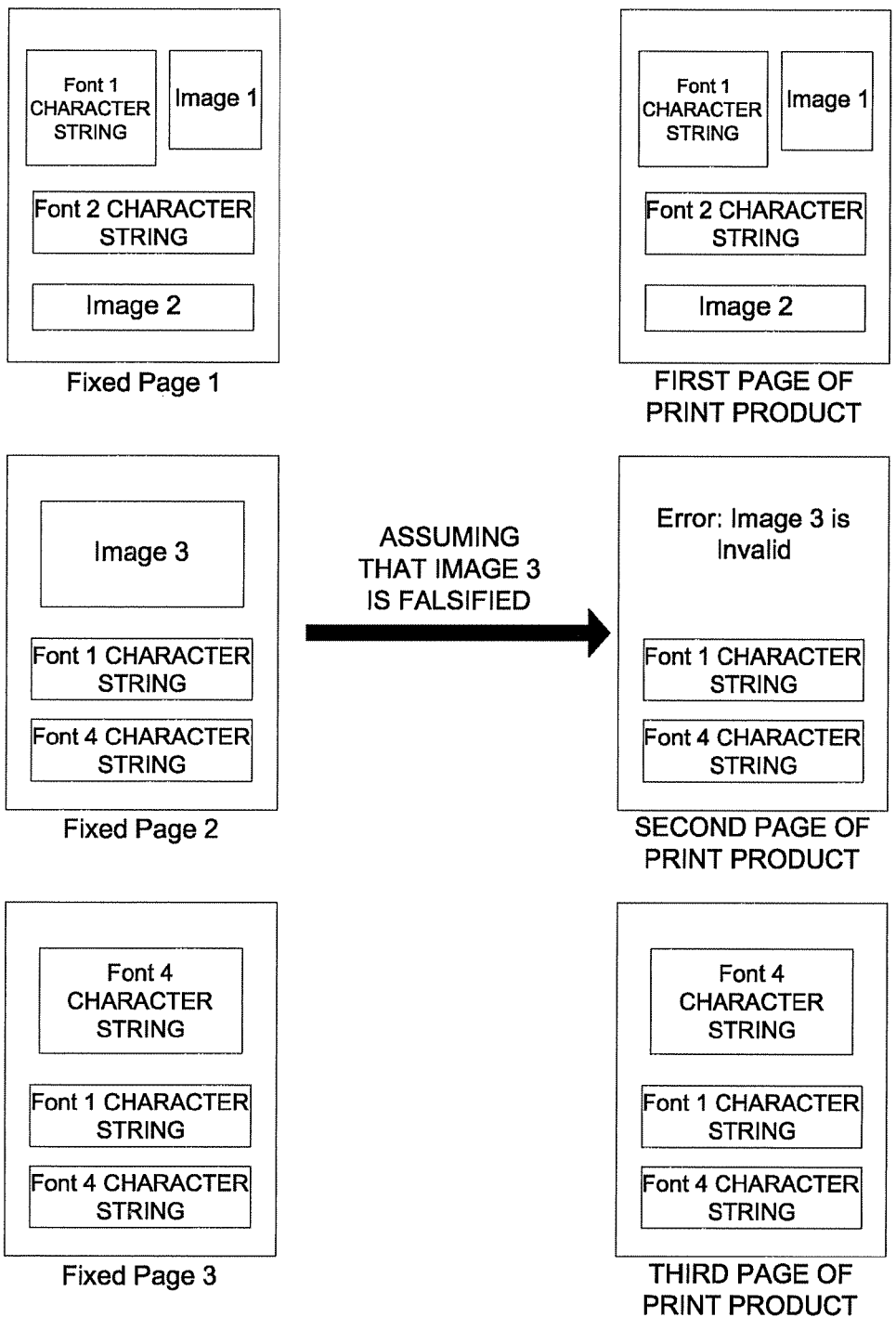
FIG. 19 shows examples of documents printed in a Print Only Valid Part mode to be employed in an image forming apparatus embodied in the present invention.

In order to describe the preferred embodiment of the present invention in detail, referring to FIG. 1 through FIG. 19, an image forming apparatus and a printing method and a control program, embodied in the present invention, will be detailed in the following. FIG. 1 shows a schematic diagram of a configuration of the printing system embodied in the present invention, FIG. 2 shows a block diagram indicating a configuration of a computer terminal device, and FIG. 3 shows a block diagram indicating a configuration of the image forming apparatus. Further, FIG. 4 shows an extracted part of the whole specification of the XPS, FIG. 5 shows a structure of the XPS data, FIG. 6 shows an exemplified configuration of a print setting screen to be displayed on an operating display section of the computer terminal device, and FIG. 7 shows a flowchart of the printing procedures to be employed in the printing system embodied in the present invention. Still further, FIGS. 8-16 show flowcharts of detailed printing procedures in the printing method embodied in the present invention, and FIG. 17 shows an exemplified configuration of an Error Report. Yet further, FIG. 18 and FIG. 19 show concrete examples of the documents printed by the printing system embodied in the present invention.

As shown in FIG. 1, the printing system 10, embodied in the present invention, is constituted by: a single or a plurality of computer terminal device(s) 20 in each of which an application program for creating a document based on a standard conformity with the XPS, etc., is installed in advance, so as to create the document by executing the application program, and which transmits print data described in the PDL (Page Description Language); and a single or a plurality of image forming apparatus(es) 30, such as a printer, a digital compound apparatus (or a multi-functioned apparatus), etc., which prints the document based on the print data acquired. The single or the plurality of computer terminal device(s) 20 and the single or the plurality of image forming apparatus(es) 30 are coupled to each other through a communication network, such as a LAN (Local Area Network), a WAN (Wide Area Network), etc.

Further, as shown in FIG. 2, the computer terminal device 20 is provided with a control section 21 including a CPU (Central Processing Unit) 21a, a ROM (Read Only Memory) 21b, a RAM (Random Access Memory) 21c, etc.; a storage device 22, such as a Hard Disc Drive, etc., to store various kinds of programs and data; an inputting device 23, such as a keyboard, etc., to be operated for inputting data so as to implement a document creating operation, etc.; a display device 24, such as a LCD (Liquid Crystal Display), etc., to display contents of the document created in the above and the print setting screen; and a network coupling section 25, such as a NIC (Network Interface Card), a modem, etc., to couple the computer terminal device 20 to the communication network. In the normal operation, the application programs for creating documents are read form the ROM 21b or the storage device 22 into the RAM 21c, while the CPU 21a transmits the printing request generated by executing the document creating application programs to the image forming apparatus 30, which is coupled to the communication network, so that the image forming apparatus 30 conducts the printing operation of the document concerned.

In this connection, although a personal computer is indicated as the computer terminal device 20 in FIG. 1, any other device, for instance, a PDA (Personal Digital Assistants) device, can be employed as the computer terminal device 20, as far as the concerned device is capable of creating print data.

Still further, as shown in FIG. 3, the image forming apparatus 30 is constituted by a CPU 31a, a ROM 31b, a RAM 31c, a HDD (Hard Disc Drive) 32, a USB (Universal Serial Bus) interface 33, a LAN interface 34, a display operating section 35, a language analyzing section 36, an image processing section 37, a digital signature analyzing section 38, a printing section 39, etc., all of which are coupled to each other through a bus.

The ROM 31b stores various kinds of programs and data necessary for controlling the overall operations of the image forming apparatus 30 in it. The RAM 31c temporarily stores data to be employed for a controlling operation currently conducted by the CPU 31a and/or other data to be temporarily stored during the controlling operation in it. Accordingly, in conjunction with the ROM 31b and the RAM 31c, the CPU 31a serves as a controlling section to control the overall operations of the image forming apparatus 30.

The HDD 32 stores various kinds of print data, etc., acquired from the computer terminal device 20 in it.

The LAN interface 34 serves as an interface for coupling the image forming apparatus 30 to the communication network, such as a NIC, a modem, etc., so as to receive the print data transmitted from the computer terminal device 20.

The USB interface 33 serves as another interface for coupling various kinds of USB (Universal Serial Bus) devices, such as a USB memory, etc., to the image forming apparatus 30.

The display operating section 35 is constituted by a displaying section, such as a LCD (Liquid Crystal Display), etc., and an operating section, such as a touch panel, etc., so as to display icons, key-buttons and various kinds of settings necessary for the printing operation on the LCD or the like, and to output operational signals inputted from the touch panel or the like.

The language analyzing section 36 parses the print data, such as the data created based on the XPS (hereinafter, referred to as the XPS data, the PDF (Portable Document Format) data, the print data described in the Page Description Language (PDL) being any one of the PS (Post Script), the PCL (Printer Control Language), etc., inputted from the computer terminal device 20 through the LAN interface 34, so as to create new data described in an intermediate format (hereinafter, referred to as intermediate data) to be developed into other data described in a bitmap format (hereinafter, referred to as bitmap data) from the inputted print data. Further, in addition to the above, the language analyzing section 36 extracts a parameter for specifying the printing mode from the print data. In this connection, although the language analyzing section 36 is exemplified as a hardware configuration in the present embodiment, it is also applicable that the language analyzing section 36 is configured as a software function embodied by the CPU 31a executing the programs stored in the ROM 31b or the HDD 32.

The image processing section 37 creates the bitmap data, serving as printable data, from the intermediate data created by the language analyzing section 36.

The digital signature analyzing section 38 parses the digital signature attached to the print data. In this connection, the digital signature of the XPS is conformity with that of the XML, and accordingly, it is possible to attach the digital signature to the XPS data.

The printing section 39 prints an image based on the bitmap data created by the image processing section 37. Concretely speaking, in the printing section 39, an exposure section irradiates a light (for instance, a laser beam) modulated according to the bitmap data onto a photoreceptor drum uniformly charged with electrostatic charge by a charging device, so as to form a latent image on the photoreceptor drum. Successively, a developing device develops the latent image with toner, and the developed toner image is finally transferred onto a paper medium through a primary transfer roller and a secondary transfer belt. Then, a fixing device fixes the toner image onto the paper medium, which is then ejected outside the image forming apparatus 30. Incidentally, the exposure section, the photoreceptor drum, the developing device, the primary transfer roller, the secondary transfer belt and the fixing device are included in the printing section 39 and are not shown in the drawings.

Further, since the configuration shown in FIG. 3 is merely one of examples of the image forming apparatuses embodied in the present invention, it is also applicable that the USB interface 33, etc. can be excluded from the configuration, and/or a finisher that conducts various kinds of post processing, such as a staple processing, a punch processing, etc., is added to the configuration, as far as the printing operation based on the valid of the digital signature can be implemented according to the parameter established in advance.

The procedure for printing the document created by executing the document creating application programs on the basis of the standard, such as the XPS, etc., in the printing system 10 having the aforementioned configuration will be detailed in the following. To make the explanation of the present embodiment easy, the structure of the XPS data will be detailed at first.

FIG. 5 shows the structure of the XPS data, in which each of plain blocks without a pattern indicates an indispensable element, while each of hatched blocks indicates an optional element serving as an additional element. The indispensable elements include: the Fixed Document Sequence to store information of the overall document; the Fixed Document to store information of all of the pages; the Fixed Page to store information of each of the pages; the Font to store fonts; the image to store images; etc., while the optional elements include: the Signature Part to store digital signatures; and the Print Ticket to store print setting information of the job-level, the Document-level and the Page-level. The Fixed Document part is referred from the Fixed Document Sequence, while the Fixed Page part is referred from the Fixed Document part.

In the abovementioned structure of the XPS data, the Job Digital Signature Processing keyword for setting the printing mode is set into the Print Ticket. However, in the conventional structure, since only the three keywords, including the "Print Invalid Signature" for printing the job irrespective of valid or invalid of the digital signature, the "Print Invalid Signature With Error Report" for printing the job irrespective of valid or invalid of the digital signature and a page indicating that the digital signature is invalid (hereinafter, referred to as the Error Report), and the "Print Only Valid Signature" for printing the job when the digital signature is valid, are set into the Print Ticket as the Job Digital Signature Processing keyword as shown in FIG., there have been arisen such the problems as described in the "BACKGROUND OF THE INVENTION".

In order to solve the above problems, in the present embodiment, new three keywords, including a "Print Only Error Report" for printing only the Error Report when the digital signature is invalid, a "Print Only Valid Page" for printing only a page for which the digest value of the digital signature is correct, while printing the Error Report of another page for which the digest value of the digital signature is incorrect, and a "Print Only Valid part" for printing only a part for which the digest value of the digital signature is correct, while printing the Error message with respect to another part for which the digest value of the digital signature is incorrect, are added to the Job Digital Signature Processing keyword. Further, when the XPS data are created in the computer terminal device 20, a selected keyword selected from the total six keywords is attached to the XPS data, and then, the language analyzing section 36 extracts the selected keyword from the XPS data when analyzing the XPS data, so as to implement the printing operation according to the printing mode specified by the extracted keyword. Accordingly, the abovementioned problems can be solved by the present embodiment.

Although the new tree keywords, including the "Print Only Error Report", the "Print Only Valid Page" and the "Print Only Valid part" are newly established in addition to the conventional three keywords, including the "Print Invalid Signature", the "Print Invalid Signature With Error Report" and the "Print Only Valid Signature", in the present embodiment, it is also applicable as another example that a printing mode, in which only such a print object for which the digital signature is valid is printed on the basis of the print data, is added, and accordingly, it is also applicable that at least any one of the "Print Only Valid Page" and the "Print Only Valid part" is added to the conventional three keywords.

Next, referring to the flowchart shown in FIG. 7, a brief procedure of the print processing to be conducted in the printing system 10 embodied in the present invention will be detailed in the following.

Initially, the application program for creating the document based on the XPS is read out from the ROM 21b or the storage device 22 of the computer terminal device 20 and activated to create print data (herein, the XPS data). Alternatively, the user acquires the XPS data through the communication network. Successively, when the user inputs a printing instruction from the inputting device 23, the control section 21 of the computer terminal device 20 makes the display device 24 display the print setting screen as shown in FIG. 6.

The print setting screen is constituted by a paper sheet setting area to set a direction and a size of the document, an output paper sheet size, a paper sheet feeding tray, etc., an output setting area to set an outputting method and a number of copies, a paper sheet ejecting tray, enable or disable of a sorting operation, etc., a bookbinding setting area to set a binding position and a kind of printing, a page allotting, a stapling, enable or disable of a punching operation, etc., a digital signature setting area to set the digital signature and the Job Digital Signature Processing keyword, etc. The user uses the inputting device 23 to set each of setting items in the paper sheet setting area, the output setting area and the bookbinding setting area. Further, the user establishes the digital signature in the digital signature setting area, and selects a desired keyword from the Job Digital Signature Processing keyword. In this connection, FIG. 6 shows such a case that the aforementioned six keywords are displayed in a selectable manner as the Job Digital Signature Processing keyword, and the "Print Only Valid Page" is selected from the six keywords.

Successively, the control section 21 of the computer terminal device 20 control the network coupling section 25 so as to transmits the XPS data attached with the digital signature and the specific keyword selected from the Job Digital Signature Processing keyword to the image forming apparatus 30. Then, the CPU 31a of the image forming apparatus 30 receives the XPS data through the LAN interface 34, to transfer the received XPS data to the language analyzing section 36.

Still successively in Step S100, the language analyzing section 36 applies the language analysis processing to the print data. The language analysis processing is such a processing to convert the print data to the intermediate data, and to store the converted intermediate data into the RAM 31c. The intermediate data is generated corresponding to the feature of the print object included in the print data. For instance, the intermediate data of the text data or the graphics data are the data in the vector format. Further, in the present embodiment, at the time of applying the language analysis processing, the language analyzing section 36 extracts the Job Digital Signature Processing keyword from the job-level Print Ticket, while the digital signature analyzing section 38 extracts the digital signature from the Signature Part, so as to parse the extracted digital signature to determine whether or not it is valid, and creates the intermediate data based on the result of determining whether or not the digital signature is valid, according to the printing mode specified by the Job Digital Signature Processing keyword.

Still successively in Step S200, the image processing section 37 reads out the intermediate data stored in the RAM 31c, and applies the rasterize processing (for instance, such a processing to develop the information in the vector form so as to convert them into a confluence of points) to the intermediate data in a unit of bundle in order to create the bitmap data, and then, deletes the intermediate data from the RAM 31c.

Still successively in Step S300, the CPU 31a transmits the bitmap data to the printing section 39 for every bundle. In the printing section 39, the printing operation is implemented in such a manner that a toner image based on the bitmap data transmitted from the CPU 31a is formed on the photoreceptor drum, and then, transferred onto the paper medium through the primary transferring roller and the secondary transferring belt, and finally, fixed onto the paper medium.

Each of the processing mentioned in the above will be detailed in the following.

<Language Analysis Processing>

Figure 8:
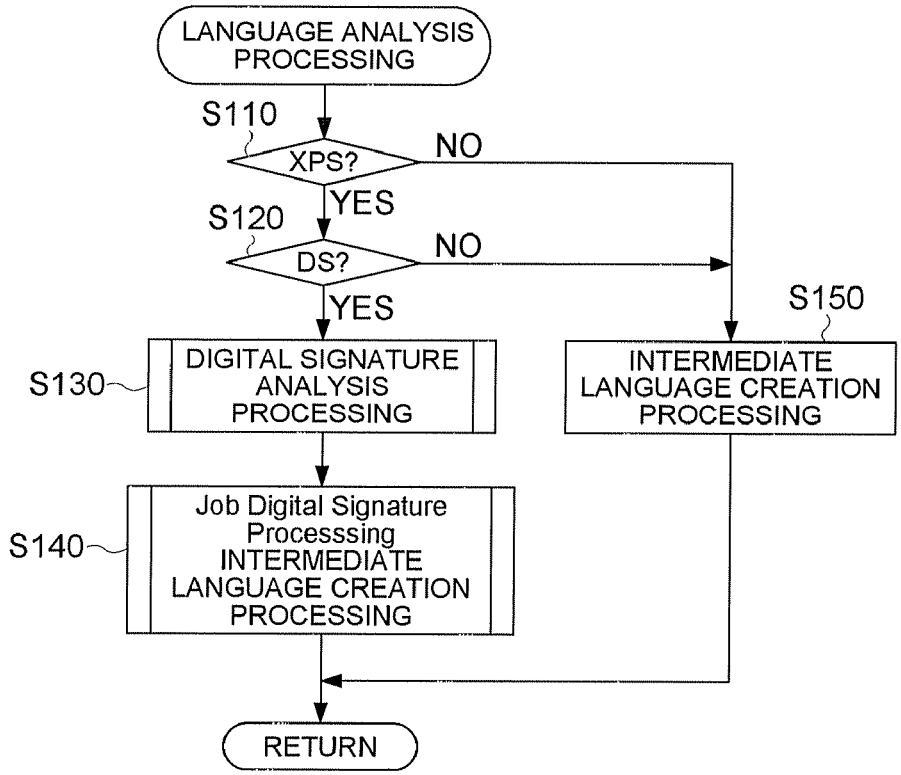
FIG. 8 shows a flowchart of a language analysis processing procedure to be employed in an image forming apparatus embodied in the present invention.

FIG. 8 shows a flowchart indicating a detailed procedure of the language analysis processing to be conducted in Step S100 shown in FIG. 7. In Step S110, the language analyzing section 36 determines whether or not the inputted print data are the XPS data. When determining that the inputted print data are not the XPS data, the language analyzing section 36 conducts the intermediate data creating processing to create the intermediate data in Step S150. When determining that the inputted print data are the XPS data, the language analyzing section 36 further determines whether or not the digital signature is attached to the Signature Part of the XPS data in Step S120. When determining that the digital signature is not attached, the language analyzing section 36 creates the intermediate data in Step S150. When determining that the digital signature is attached, the digital signature analyzing section 38 conducts the digital signature analysis processing in Step S130, and then, based on the result of the digital signature analysis, the language analyzing section 36 implements the Job Digital Signature Processing intermediate language creating processing in Step S140.

<Digital Signature Analysis Processing>

Figure 9:
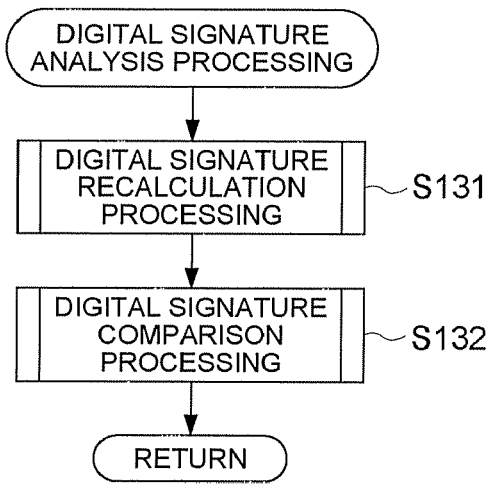
FIG. 9 shows a flowchart of a digital signature analysis processing procedure to be employed in an image forming apparatus embodied in the present invention.

FIG. 9 shows a flowchart indicating a detailed procedure of the digital signature analysis processing to be conducted in Step S130 shown in FIG. 8. In Step S131, the digital signature analyzing section 38 conducts the digital signature recalculation processing, in which the digital signature of the XPS data is recalculated. Successively, in Step S132, the digital signature analyzing section 38 conducts the comparing operation to determine whether or not the recalculated digital signature agrees to the digital signature attached to the XPS data, in order to determine whether or not the XPS data are falsified, based on the result of the above comparing operation.

<Digital Signature Recalculation Processing>

Figure 10:
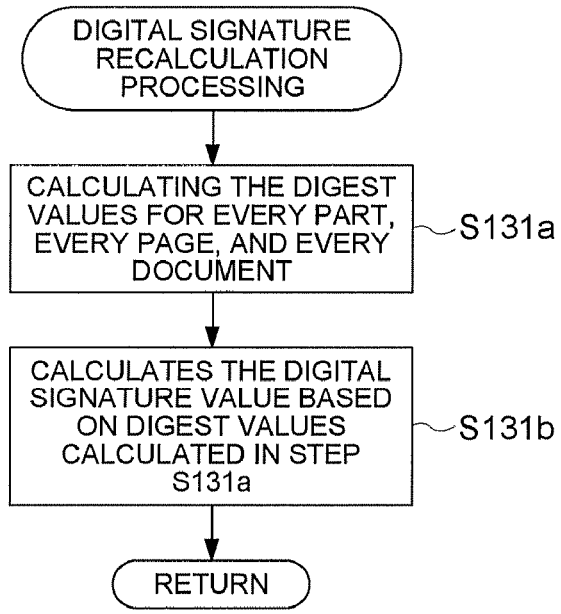
FIG. 10 shows a flowchart of a digital signature recalculation processing procedure to be employed in an image forming apparatus embodied in the present invention.

FIG. 10 shows a flowchart indicating a detailed procedure of the digital signature recalculation processing to be conducted in Step S131 shown in FIG. 9. In Step S131a, the digital signature analyzing section 38 calculates the digest values for every part, every page, and every document of the XPS data. Successively, in Step S131b, the digital signature analyzing section 38 calculates the digital signature value by employing all of the digest values calculated in the above. Incidentally, since the calculating method of the digest value and the digital signature value is substantially the same as the digital signature method of the XML of the general purpose, its explanation is omitted herein.

<Digital Signature Comparison Processing>

Figure 11:
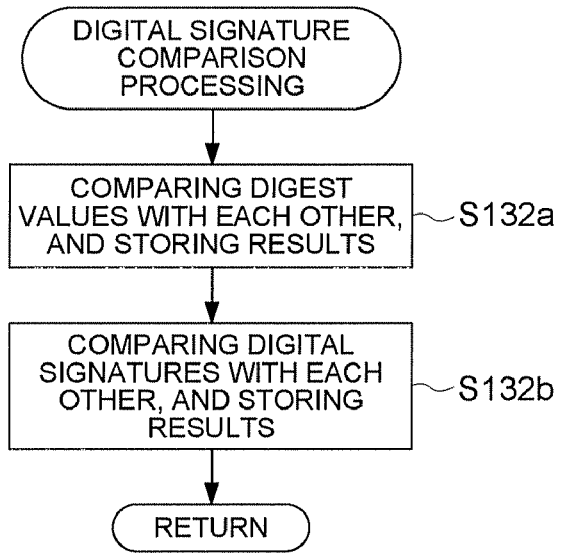
FIG. 11 shows a flowchart of a digital signature comparison processing procedure to be employed in an image forming apparatus embodied in the present invention.

FIG. 11 shows a flowchart indicating a detailed procedure of the digital signature comparison processing to be conducted in Step S132 shown in FIG. 9. In Step S132a, the digital signature analyzing section 38 compares the digest values, recalculated in the digital signature recalculation processing, with each other, and stores the results of determining whether or not each of them is valid. Successively, in Step S132b, the digital signature analyzing section 38 compares the digital signatures with each other, and stores the result of determining whether or not it is valid.

<Job Digital Signature Processing Intermediate Language Creating Processing>

Figure 12:
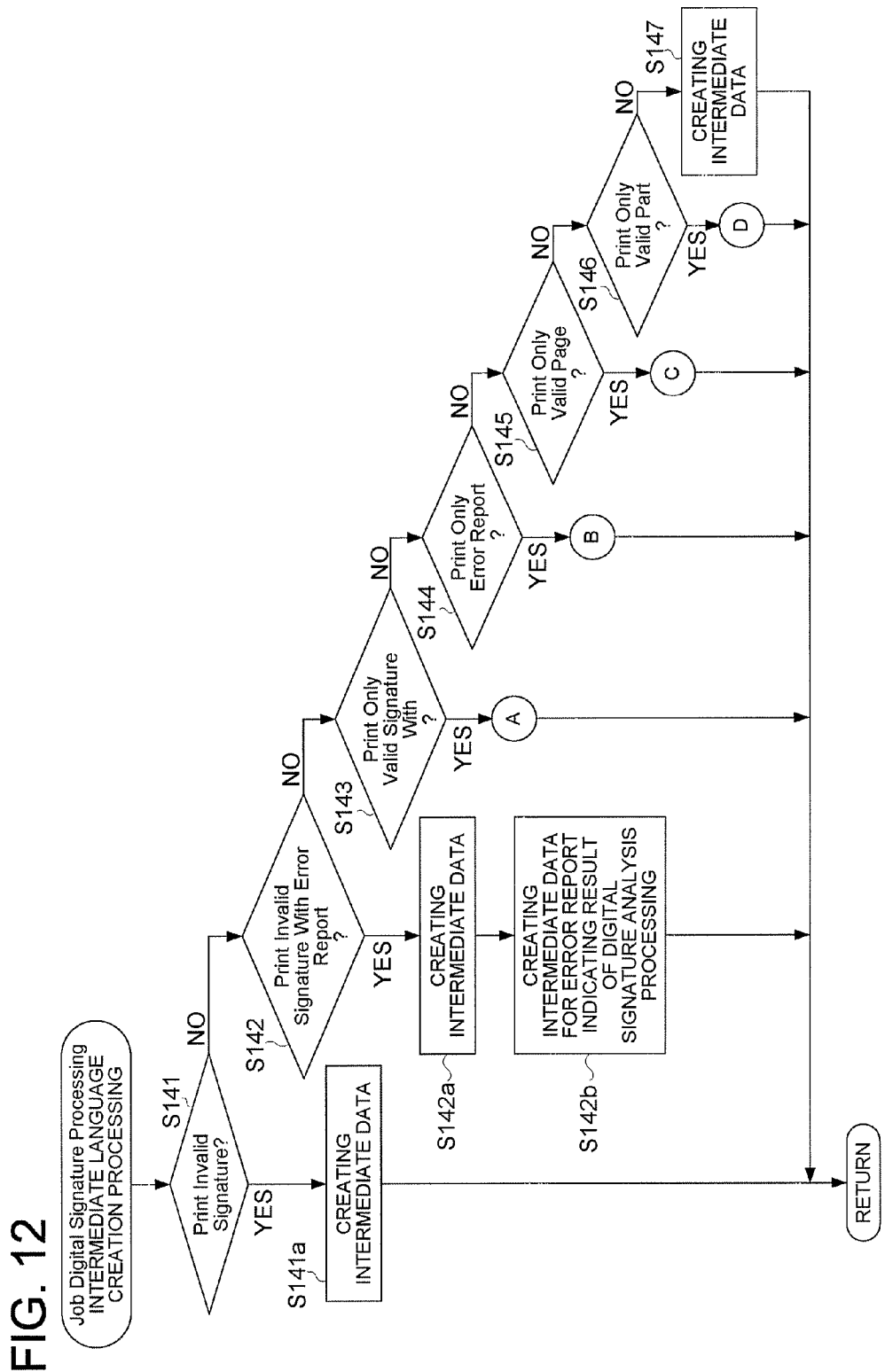
FIG. 12 shows a flowchart of an intermediate language creation processing procedure of Job Digital Signature Processing, to be employed in an image forming apparatus embodied in the present invention.

FIG. 12 shows a flowchart indicating a detailed procedure of the Job Digital Signature Processing intermediate language creating processing to be conducted in Step S140 shown in FIG. 8. The intermediate data are created by conducting the following processing, according to the Job Digital Signature Processing keyword attached to the XPS data.

1. In the Case of "Print Invalid Signature" (when YES in Step S141)

Irrespective whether the digital signature is valid or invalid, the language analyzing section 36 creates the intermediate data in Step S141a, as well as in the normal case.

2. In the Case of "Print Invalid Signature with Error Report" (when NO in Step S141, and when YES in Step S142)

Irrespective whether the digital signature is valid or invalid, the language analyzing section 36 creates the intermediate data in Step S142a, as well as in the normal case, and then, in Step S142b, creates the intermediate data for the Error Report in which a character string specifying a page or a part, which is determined as invalid by the digital signature analysis processing, is described.

3. In the Case of "Print Only Valid Signature" (when NO in Step S141 and Step S142, and when YES in Step S143)

Figure 13:
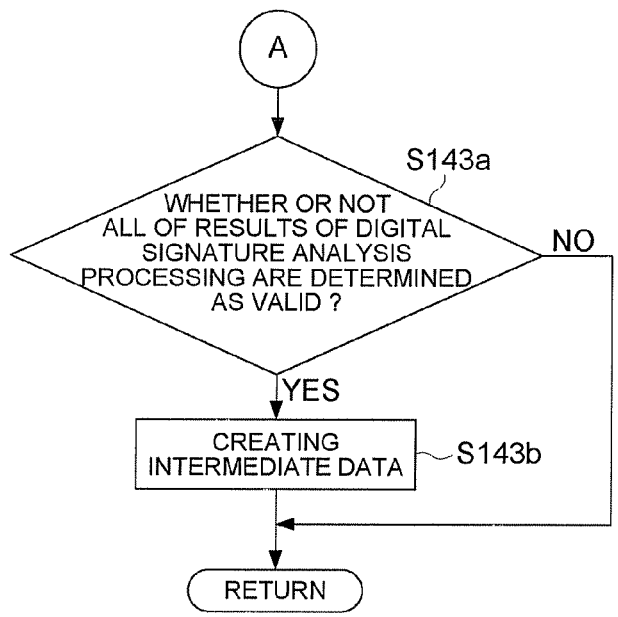
FIG. 13 shows a flowchart of a processing procedure in a Print Only Valid Signature mode, to be employed in an image forming apparatus embodied in the present invention.

As indicated in the flowchart shown in FIG. 13 that indicates detail of block A shown in FIG. 12, the language analyzing section 36 determines whether or not all of the results of the digital signature analysis processing are determined as valid in Step S143a. Only when all of the results are determined as valid, the language analyzing section 36 creates the intermediate data in Step S143b, as well as in the normal case. When any one of the results is determined as invalid, the language analyzing section 36 does not create the intermediate data. In this case, since no intermediate data exist, none of processing is conducted in the image processing to be conducted in Step S200 and nothing is printed in the print processing to be conducted in Step S300, both shown in FIG. 7.

4. In the Case of "Print Only Error Report" (when NO in Step S141, Step S142 and Step S143, and when YES in Step S144)

Figure 14:
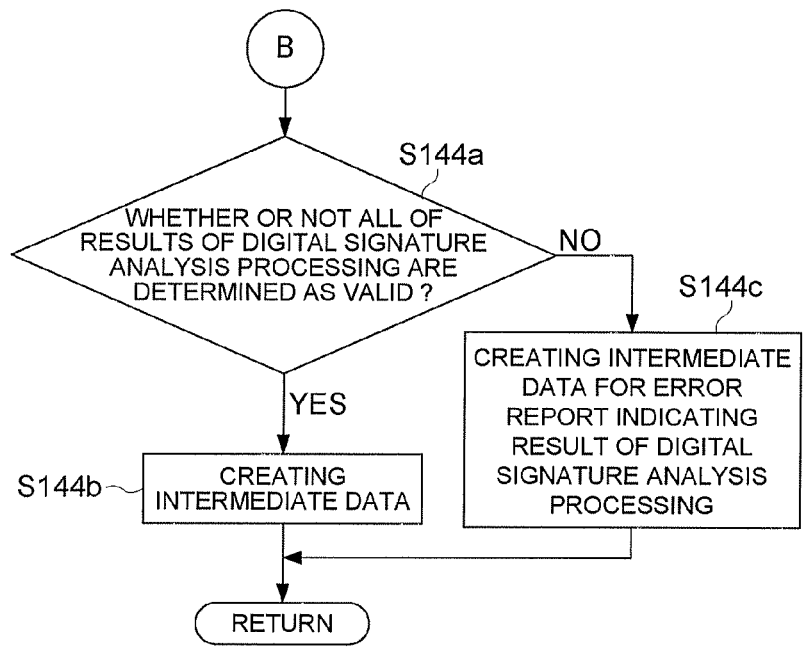
FIG. 14 shows a flowchart of a processing procedure in a Print Only Error Report mode, to be employed in an image forming apparatus embodied in the present invention.

As indicated in the flowchart shown in FIG. 14 that indicates detail of block B shown in FIG. 12, the language analyzing section 36 determines whether or not all of the results of the digital signature analysis processing are determined as valid in Step S144a. When all of the results are determined as valid, the language analyzing section 36 creates the intermediate data in Step S144b, as well as in the normal case. When any one of the results is determined as invalid, the language analyzing section 36 create the intermediate data for the Error Report in which a character string specifying a page or a part, which is determined as invalid by the digital signature analysis processing, is described, in Step S144c.

5. In the Case of "Print Only Valid Page" (when NO in Step S141, Step S142, Step S143 and Step S144, and when YES in Step S145)

Figure 15:
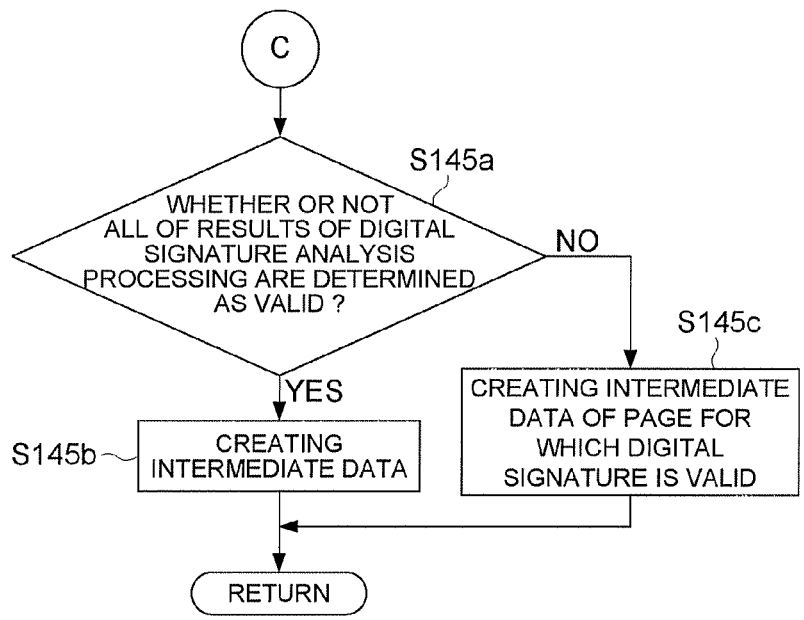
FIG. 15 shows a flowchart of a processing procedure in a Print Only Valid Page mode, to be employed in an image forming apparatus embodied in the present invention.

As indicated in the flowchart shown in FIG. 15 that indicates detail of block C shown in FIG. 12, the language analyzing section 36 determines whether or not all of the results of the digital signature analysis processing are determined as valid in Step S145a. When all of the results are determined as valid, the language analyzing section 36 creates the intermediate data in Step S145b, as well as in the normal case. When any one of the results is determined as invalid, the language analyzing section 36 creates the intermediate data for a page, all parts included in which are determined as valid by the digital signature analysis processing, in Step S145c. Another page, which includes a part determined as invalid, is printed as a white paper (a blank page), or printed as the Error Report in which a character string indicating that the concerned page is an invalid page and another character string indicating the detail of the error (the part determined as invalid) as needed.

6. In the Case of "Print Only Valid Part" (when NO in Step S141, Step S142, Step S143, Step S144 and Step S145, and when YES in Step S146)

Figure 16:
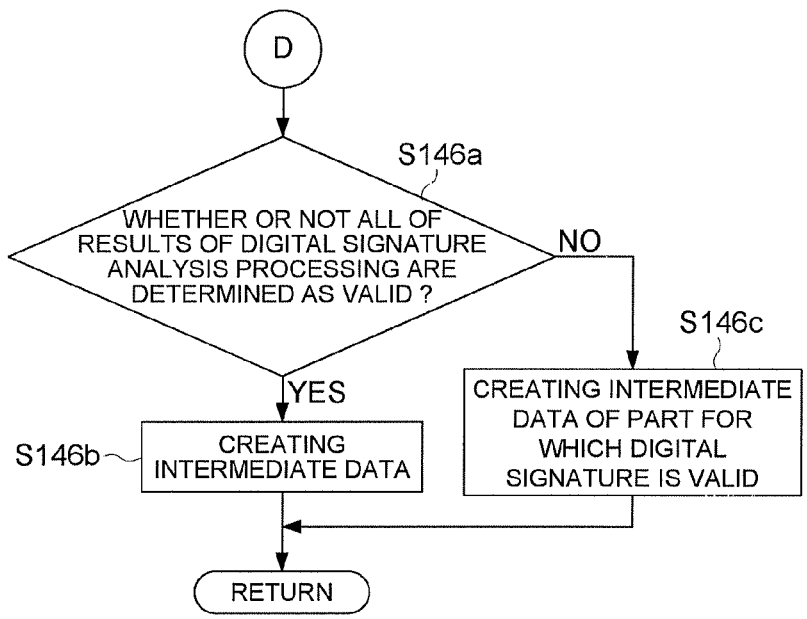
FIG. 16 shows a flowchart of a processing procedure in a Print Only Valid Part mode, to be employed in an image forming apparatus embodied in the present invention.

As indicated in the flowchart shown in FIG. 16 that indicates detail of block D shown in FIG. 12, the language analyzing section 36 determines whether or not all of the results of the digital signature analysis processing are determined as valid in Step S146a. When all of the results are determined as valid, the language analyzing section 36 creates the intermediate data in Step S146b, as well as in the normal case. When any one of the results is determined as invalid, the language analyzing section 36 creates the intermediate data for a part, which is determined as valid by the digital signature analysis processing, in Step S146c. With respect to another part determined as invalid, nothing is printed, or a character string, indicating that the concerned part is invalid, is printed. In this connection, it is also applicable that, when determining that a certain part of a whole page is invalid, the concerned page is printed as the Error Report in which a character string indicating that the concerned page includes an invalid part and another character string indicating the detail of the error (the part determined as invalid) as needed.

When determining as NO in Step S141 through Step S146, the language analyzing section 36 creates the intermediate data in Step S147, as well as in the normal case.

Successively in Step S200, the image processing section 37 applies the rasterize processing to the intermediate data in a unit of bundle in order to create the bitmap data, and transmits the bitmap data to the printing section 39 for every bundle. Then, in Step S300, the printing section 39 conduct the print processing based on the bitmap data received.

FIG. 17 shows an example of an Error Report 40 outputted in case that data of Image 1, data of Font 1 and Fixed Page 2 are falsified. When the parameter is set at the "Print Only Valid Page", the intermediate data, in which a character string indicating detail of the part determined as a falsified part by the digital signature comparison processing is described, is created. The Error Report 40 is printed, based on the intermediate data created in the above.

Next, examples of the printing results in the "Print Only Valid Page" mode and the "Print Only Valid Part" mode, which are distinctive printing modes of the present embodiment, will be detailed in the following.

FIG. 18 shows examples of pages printed in the "Print Only Valid Page" mode. When the "Font 4" is falsified, although the first page, in which the "Font 4" is not used, is printed as usual, the Error Report 40 describing a character string indicating that the second page and the third page, in which the "Font 4" is actually used, are invalid (for instance, Page 2 is invalid), and another character string indicating its detail (for instance, Detail: Font4 is invalid) is printed on the second page and the third page. It is also applicable that the second page and the third page are outputted as blank pages.

FIG. 19 shows examples of pages printed in the "Print Only Valid Part" mode. When the "Image 3" is falsified, although the first page and the third page, in each of which the "Image 3" is not used, is printed as usual, a character string indicating that the Image 3 is the invalid (or falsified) part (for instance, Error: Image 3 is invalid) is printed at the area in which the Image 3, which uses the "Image 3" and resides in the second page, is to be printed. In this connection, although the character string is printed at the area in which the invalid part is to be printed in the present embodiment, it is also applicable that the character string is printed at any position within the page concerned. Further, as aforementioned, it is also applicable that the page including the invalid part is printed as the Error Report.

As described in the foregoing, according to the aforementioned embodiment of the present invention, the new three keywords, including the "Print Only Error Report", the "Print Only Valid Page" and the "Print Only Valid part" are newly established in addition to the conventional three keywords, including the "Print Invalid Signature", the "Print Invalid Signature With Error Report" and the "Print Only Valid Signature", as the Job Digital Signature Processing keyword, and the total six keywords are made to be selectable when the user creates the XPS data in the computer terminal device 20. On the other hand, in the image forming apparatus 30, the language analyzing section 36 extracts the keyword from the received XPS data when analyzing the XPS data, and the digital signature analyzing section 38 determines whether or not the digital signature is valid for every part, every page and every document. Then, according to the printing mode specified by the extracted keyword, the printing operation is implemented on the basis of whether or not the digital signature is valid. According to the above, when the printing operation is conducted in the "Print Only Valid Page" mode or the "Print Only Valid Part" mode, it becomes possible to surely provide a page or a part for which the digital signature is valid to the user, without showing another page or another part for which the digital signature is invalid. Further, by embedding a character string indicating a message of invalid into a page or a part for which the digital signature is invalid, it becomes possible to notify the user of which page or which part is falsified, resulting in an improvement of the user's convenience.

In this connection, various aspects with respect to the printing modes to be conducted in the image forming apparatus 30 have been detailed by exemplifying the embodiment of the present invention. By displaying both the print object for which the digital signature is valid and the other print object for which the digital signature is invalid in the screen of the computer terminal device 20 at which the user creates or acquires the print data, it becomes possible for the user who issues the printing instruction to determine which page or which part is falsified, resulting in an improvement of the user's convenience.

Further, although the printing method for the document created on the basis of the XPS has been indicated in the embodiment described in the foregoing, the scope of the present invention is not limited to the aforementioned embodiment. According to present invention, another document, which is created by employing another application program, can be also controlled in such a manner that the printing operation of a page or a part for which the digital signature is valid is enabled, while the printing operation of another page or another part for which the digital signature is invalid is disabled, as well. Still further, although the example in which the print data are falsified has been indicated in the aforementioned embodiment, the present invention is also applicable for such a case that the printing operation of a specific page or a specific part is allowed or limited for every user, as well.

The present invention is applicable for the image forming apparatus that conducts the printing operation based on the print data created by a predetermined application program, the image forming method to be employed in the network system including the image forming apparatus concerned and the controlling program to be executed in the image forming apparatus concerned.

According to the image forming apparatus, the printing method and the control program, embodied in the present invention, it becomes possible to appropriately print each of a valid print object and an invalid print object, so as to improve the user's convenience.

This is because, when the print product to be printed on the basis of the print data is constituted by a plurality of pages or a plurality of parts, and includes both a page or a part for which the digital signature is valid and another page or another part for which the digital signature is invalid, the present invention makes it possible to print the page or the part for which the digital signature is valid based on the print data, while not to print the other page or the other part for which the digital signature is invalid based on the print data, instead of printing all of the document irrespective of valid or invalid of the digital signature, or not printing all of the document when only a par to digital signature of the page or the part is invalid.

While the preferred embodiments of the present invention have been described using specific term, such description is for illustrative purpose only, and it is to be understood that changes and variations may be made without departing from the spirit and scope of the appended claims.

What is claimed is:

1. An image forming apparatus that produces a print product constituted by at least one page, based on print data representing a plurality of print objects which are to be included within the at least one page, comprising:
   printing section to conduct a printing operation;
   digital signature analyzing section to analyze a digital signature attached to a print object to determine whether the digital signature is valid or invalid; and
   control section to control the printing section based on the print data,
   wherein, in a case where (A) a plurality of digital signatures are respectively attached to the plurality of print objects which are to be included within the at least one page, and (B) the plurality of print objects which are to be included within the at least one page includes both of a valid print object for which the digital signature is valid and an invalid print object for which the digital signature is invalid, the control section enables an image formation for the valid print object based on the print data while disables an image formation for the invalid print object based on the print data.

2. The image forming apparatus of claim 1,
   wherein, in the case where the conditions (A) and (B) are satisfied, the control section selectively controls the printing section in any one of at least three printing modes, including:
   a first printing mode in which the control section enables both the valid print object and the invalid print object to be printed based on the print data;
   a second printing mode in which the control section disables both the valid print object and the invalid print object to be printed based on the print data; and
   a third printing mode in which the control section enables the valid print object to be printed based on the print data, while disables the invalid print object to be printed based on the print data.

3. The image forming apparatus of claim 1,
   wherein, when the invalid print object is included in a specific page, an Error Report, which includes a character string indicating that the specific page includes the invalid print object, is printed on the specific page.

4. The image forming apparatus of claim 1,
   wherein, when the invalid print object is a specific part included in the at least one page, a character string, indicating that the specific part is invalid, is printed on an area on which invalid contents of the specific part is to be printed.

5. The image forming apparatus of claim 1,
   wherein the print data is created, based on an XPS.

6. A printing method to be employed in a system which is constituted by: a terminal device that creates print data representing a plurality of print objects which are to be included within at least one page of a print product, and issues a print instruction; an image forming apparatus that produces the print product constituted by the at least one page, based on the print data; and a communication network through which the terminal device and the image forming apparatus are coupled to each other, the printing method comprising:
   transmitting the print data representing the plurality of print objects, to which a plurality of digital signatures is respectively attached, from the terminal device to the image forming apparatus;
   determining whether each of the digital signatures is valid or invalid in the image forming apparatus, so that the image forming apparatus conducts a printing operation based on a result of the determination;
   wherein, when the plurality of print objects includes both a valid print object for which the digital signature is determined as valid and an invalid print object for which the digital signature is determined as invalid, the printing operation is controlled in such a manner that an image formation for the valid print object is enabled, while an image formation for the invalid print object is disabled.

7. The printing method of claim 6,
   wherein a keyword for specifying a printing mode is attached to the print data transmitted from the terminal device to the image forming apparatus, and
   wherein when the plurality of print objects includes both the valid print object and the invalid print object, the image forming apparatus conducts the printing operation according to the printing mode specified by the keyword, which is any one of at least three printing modes, including: a first printing mode in which operations for printing both the valid print object and the invalid print object are enabled; a second printing mode in which operations for printing both the valid print object and the invalid print object are disabled; and a third printing mode in which an operation for printing the valid print object is enabled, while an operation for printing the invalid print object is disabled.

8. The printing method of claim 6,
wherein, when the invalid print object is included in a specific page, an Error Report, which includes a character string indicating that the specific page includes the invalid print object, is printed on the specific page.

9. The printing method of claim 6,
wherein, when the invalid print object is a specific part included in the at least one page, a character string, indicating that the specific part is invalid, is printed on an area on which invalid contents of the specific part is to be printed.

10. The printing method of claim 6,
wherein the print data is created, based on an XPS.

11. A non-transitory computer readable medium storing a computer executable program for making an image forming apparatus produce a print product constituted by at least one page, based on print data representing a plurality of print objects which are to be included within the at least one page, a plurality of digital signatures being respectively attached to the plurality of print objects, the program comprising program code for causing the image forming apparatus to perform the steps of:
conducting a printing operation based on the print data, so as to create the print product; and
determining whether each of a plurality of digital signatures is valid or invalid, so as to control the printing operation to be conducted by the image forming apparatus, based on a result of the determination;
wherein, when the plurality of print objects includes both a valid print object for which the digital signature is determined as valid and an invalid print object for which the digital signature is determined as invalid, the printing operation is controlled in such a manner that an image formation for the valid print object is enabled, while an image formation for the invalid print object is disabled.

12. The non-transitory computer readable medium of claim 11,
wherein, when the plurality of print objects includes both a valid print object for which the digital signature is determined as valid and an invalid print object for which the digital signature is determined as invalid, the image forming apparatus conducts the printing operation according to a printing mode, which is selected from at least three printing modes, including: a first printing mode in which operations for printing both the valid print object and the invalid print object are enabled; a second printing mode in which operations for printing both the valid print object and the invalid print object are disabled; and a third printing mode in which an operation for printing the valid print object is enabled, while an operation for printing the invalid print object is disabled.

13. The non-transitory computer readable medium of claim 11,
wherein, when the invalid print object is included in a specific page, an Error Report, which includes a character string indicating that the specific page includes the invalid print object, is printed on the specific page.

14. The non-transitory computer readable medium of claim 11,
wherein, when the invalid print object is a specific part included in the at least one page, a character string, indicating that the specific part is invalid, is printed on an area on which invalid contents of the specific part is to be printed.

15. The non-transitory computer readable medium of claim 11,
wherein the print data is created, based on an XPS.

* * * * *